(12) United States Patent
Bach et al.

(10) Patent No.: US 9,174,591 B2
(45) Date of Patent: Nov. 3, 2015

(54) ROOF MOLDING

(71) Applicants: Edward William Bach, Galloway, OH (US); Jeremy J. Weinandy, Dublin, OH (US); Andrew K. Swayne, Dublin, OH (US); Anthony Ordonio, Jr., Dublin, OH (US)

(72) Inventors: Edward William Bach, Galloway, OH (US); Jeremy J. Weinandy, Dublin, OH (US); Andrew K. Swayne, Dublin, OH (US); Anthony Ordonio, Jr., Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/167,349

(22) Filed: Jan. 29, 2014

(65) Prior Publication Data

US 2015/0210228 A1    Jul. 30, 2015

(51) Int. Cl.
*B60R 13/07*   (2006.01)

(52) U.S. Cl.
CPC ..................................... *B60R 13/07* (2013.01)

(58) Field of Classification Search
CPC .......... B60R 13/04; B60R 13/06; B60R 13/07
USPC ......................................... 296/1.08, 210, 213
See application file for complete search history.

(56) References Cited

U.S. PATENT DOCUMENTS

| | | | |
|---|---|---|---|
| 5,013,083 A | 5/1991 | Yada et al. | |
| 5,829,825 A * | 11/1998 | Kim | 296/210 |
| 6,510,602 B2 | 1/2003 | Sugiura | |
| 6,695,397 B2 * | 2/2004 | Kamiya et al. | 296/210 |
| 6,709,048 B2 | 3/2004 | Nagashima et al. | |
| 6,877,798 B2 | 4/2005 | Nakajima et al. | |
| 6,974,181 B2 | 12/2005 | Mikkaichi et al. | |
| 7,004,535 B1 | 2/2006 | Osterberg et al. | |
| 7,029,060 B1 * | 4/2006 | Osterberg et al. | 296/203.03 |
| 7,045,189 B2 | 5/2006 | Hui et al. | |
| 7,165,807 B2 | 1/2007 | Wato et al. | |
| 7,604,287 B2 | 10/2009 | Mourou | |
| 7,621,574 B2 | 11/2009 | Mourou et al. | |
| 7,695,039 B2 * | 4/2010 | Sakamoto | B60R 13/06 296/1.08 |
| 8,020,354 B2 * | 9/2011 | Scroggie | B60R 13/04 52/716.2 |
| 8,205,923 B2 | 6/2012 | Mourou | |
| 8,657,370 B1 * | 2/2014 | Pierce | B60R 13/06 296/210 |
| 8,677,572 B2 * | 3/2014 | Scroggie et al. | 24/292 |
| 8,740,278 B1 * | 6/2014 | Mally | B60R 7/06 296/37.12 |
| 2012/0292950 A1 | 11/2012 | Stahlhut et al. | |

* cited by examiner

*Primary Examiner* — Pinel Romain
(74) *Attorney, Agent, or Firm* — Fay Sharpe LLP

(57) ABSTRACT

A vehicle roof molding to be fitted into a roof groove of a roof panel of a vehicle is provided. The molding has a main body for filling at least a portion of a the roof groove in a groove width direction and a latching portion on a back side of the main body to secure the roof molding within the roof groove. The main body includes a first segment and a second segment, the first and second segments resides in different planes and are joined by a wall oriented generally transverse to both segments. A pair of protruding portions are provided on opposed edges of the first and second segments, respectively. Each protruding portion includes an elastic deforming region engaging an opposed side wall of the roof groove when the latching portion is fitted in the roof groove.

20 Claims, 3 Drawing Sheets

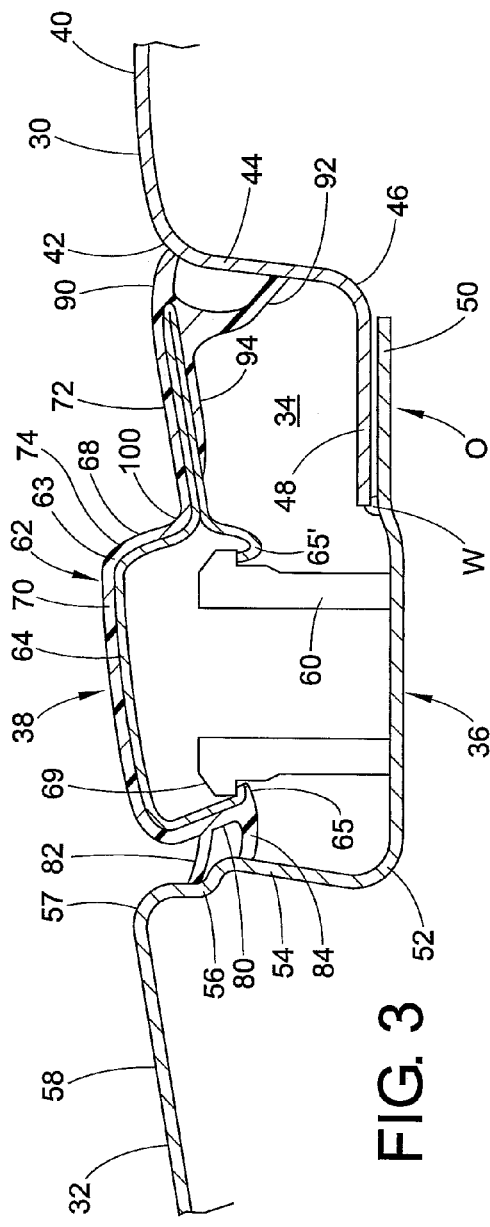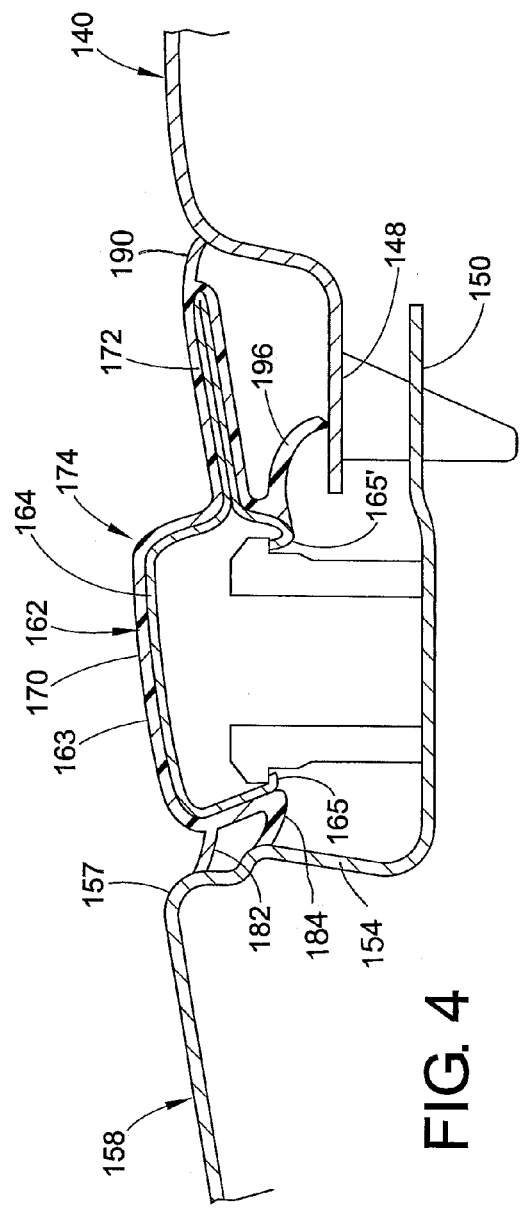

ROOF MOLDING

BACKGROUND

The present exemplary embodiment relates to a roof molding for an automotive vehicle. It finds particular application as a molding intended to close a joint between a roof panel and a side panel. However, it is to be appreciated that the present exemplary embodiment is also amenable to other similar applications.

Moldings, which are placed in a recess such as a recess between adjoining body panels in an automotive vehicle body are well known. Moldings are utilized for minimizing water and/or foreign object intrusion into the recess as well as for the aesthetic purpose of covering the recess from the customer's view in the final product.

One example of a roof molding is shown in FIGS. 1 and 2. Particularly, a pair of roof moldings M are mounted in a corresponding pair of grooves G formed between a roof panel R and side panels S. A roof panel body 10 of the roof panel R includes a first rising wall 11 extending downward from a side edge of the roof panel body 10, and a bottom wall 12 extending horizontally from a lower end of the first rising wall 11. The side panel S includes a second rising wall 13 extending downward from a side edge of the side panel S, and a bottom wall 14 extending horizontally from a lower end of the second rising wall 13. The bottom wall 12 of the roof panel R and the bottom wall 14 of the side panel S are superimposed on one another and welded to each other at 15 to form a horizontal groove bottom wall 16.

The roof molding M includes a lid 17, a base portion 18 and first and second lips 19 and 20. The lid 17 covers the opening in an upper portion of the mounting groove G, and the first and second resilient lips 19 and 20 extend laterally from a lower end of the base portion 18 and downward from the lid 17, whereby they are brought into abutment against the first and second rising walls 11 and 13, respectively.

As illustrated, the roof molding is designed to sit below the side panel to create a step that prevents water from dripping on the side passenger windows. However, this discontinuity in the surface of the vehicle can produce an undesirable aesthetic appearance. The present disclosure provides a roof molding that improves the vehicle aesthetics while maintaining the ability to channel water away from side passenger windows.

SUMMARY

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a roof joint construction for an automobile having a roof panel with a side edge and a side outer panel with an upper edge is provided. The roof joint construction includes an elongated channel extending substantially parallel to the side edge of the roof panel with first and second upwardly positioned side walls joined by a substantially horizontal base. The first side wall engages the side edge of the roof panel. The second side wall engages the upper edge of the side outer panel. A molding is provided to fill the elongated channel. The molding has an elongated body with a first molding edge engaging the side edge of the roof panel and a second molding edge engaging the side panel. A primary surface of the molding extends between the first molding edge and the second molding edge. The primary surface includes a generally planar first substantially horizontal region, a generally planar second substantially horizontal region, and a generally vertical step wall joining the first substantially horizontal region to the second substantially horizontal region.

According to a second embodiment, a vehicle roof molding to be fitted into a roof groove of a roof panel of a vehicle is provided. The molding has a main body for filling at least a portion of the roof groove in a groove width direction and a latching portion on a back side of the main body to secure the roof molding within the roof groove. The main body includes a first segment and a second segment, the first and second segments reside in different planes and are joined by a wall oriented generally transverse to both segments. A pair of protruding portions are provided on opposed sides of the first and second segments, respectively. Each protruding portion includes an elastic deforming region engaging an opposed side wall of the roof groove when the latching portion is fitted in the roof groove.

According to a further embodiment, a vehicle roof molding to be fitted into a roof groove of a roof panel of a vehicle is provided. The molding includes a main body filling at least a portion of the roof groove in a groove width direction and a latching portion on a back side of the main body to secure the roof molding within the roof groove. The main body also includes a first segment coplanar to an adjacent surface of the associated roof panel and a second segment coplanar to an adjacent surface to the associated side panel, with the first and second segments residing in different planes. The first and second segments are interconnected by a wall oriented generally transverse to each segment by which a trough is formed.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated samples, however, are not exhaustive of the many possible embodiments of the disclosure. Other advantages and novel features of the disclosure will be set forth in the following detailed description of the disclosure when considered in conjunction with the drawings, in which:

FIG. 3 is a cross-section view of a first embodiment of the roof molding of the present disclosure;

FIG. 4 is a cross-section view of a second embodiment of the roof molding of the present disclosure.

DETAILED DESCRIPTION

Figure 1:
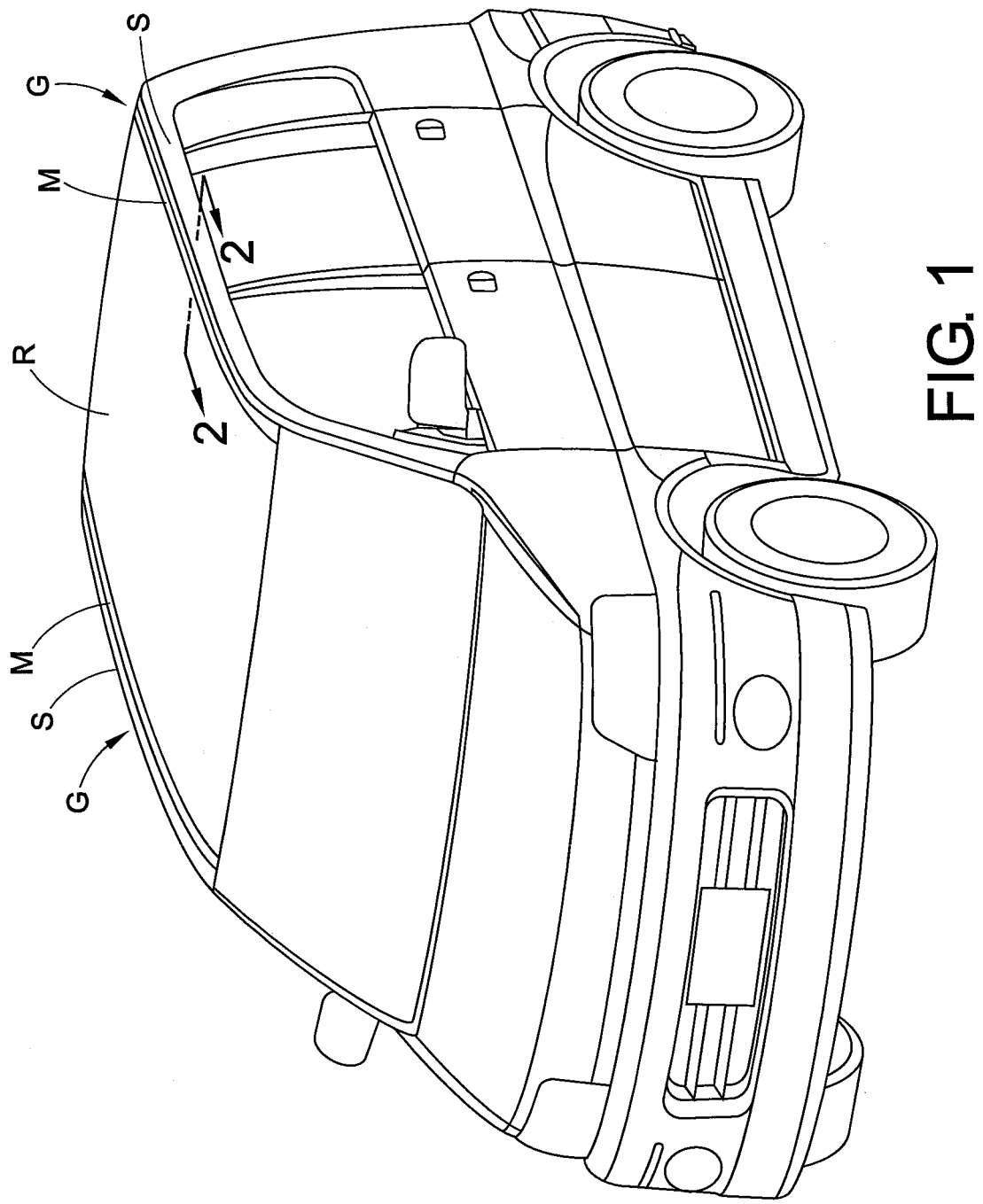
FIG. 1 is a perspective view of an automotive vehicle including a roof molding.
Figure 2:
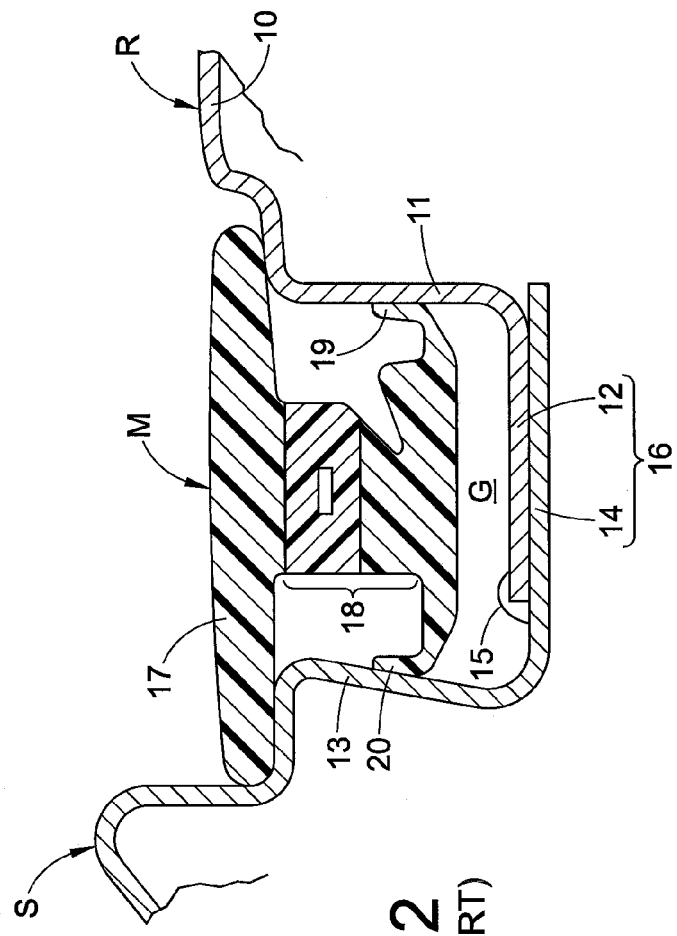
FIG. 2 is a cross-section view of a prior art roof molding.

Referring now to FIG. 3, a roof panel 30 and a side panel 32 are integrally connected by spot welding W in the vicinity of overlap 0 of the panels. More particularly, roof panel 30 and side panel 32 are cooperatively bent such that a recess 34 is formed in the mating region of the roof panel 30 and the side panel 32, the recess 34 extending in the longitudinal direction of the vehicle to form a groove 36. An elongated roof molding 38 is fitted into the groove 36. Although only a single groove/ molding combination is depicted in FIG. 3, it is noted that a groove 36 is typically formed in each lateral side of the vehicle roof (see FIG. 1) and a corresponding roof molding 38 can be provided for each groove.

Roof panel 30 includes an exposed surface 40, a top edge 42, side wall 44, a lower bend 46, and a base portion 48. The base portion 48 of roof panel 30 overlaps the base portion 50 of side panel 32. Side panel 32 includes base portion 50, lower bend 52, side wall 54, notch 56, top edge 57 and an exposed surface 58. Each of the bent portions of the roof panel 30 and the side panel 32 can be formed by press brake bending.

A plurality of projections such as roof clip members 60 are disposed along the length of groove 36 to receive and secure roof molding 38 therein. Roof clip members 60 can be comprised of metallic projections welded within the recess 34 or alternatively can be polymeric (for example polycarbonate) extensions mechanically mounted thereto. The roof molding 38 is pushed from above and joined to the roof clip members 60 as described below to be fitted into the groove 36.

The roof molding 38 includes an elongated main body 62 having a coating 63 at least partially surrounding a core 64. The coating layer 63 can be made of any material, such as plastic or rubber, providing an aesthetically pleasing appearance and weather resistance. The core can be made of any material providing sufficient strength to support the molding and maintain a mated relationship with the vehicle. The core 64 can be formed from a material have a greater stiffness than the coating 63. Moreover, the material forming the core can have a higher modulus of elasticity than the material forming the coating. The core 64 can be, for example, stainless steel, that is bent into the desired shape. The coating 63 can be, for example, a polyvinyl chloride or an equivalent thereto. The core 64 can form predominantly the inboard surface of the molding and the coating 63 can form the exposed exterior surface of the molding.

Roof molding 38 can be integrally formed by extrusion molding or in mold coating. In various embodiments, it may be desired for the coating to include a colorant that allows matching with the vehicle color.

Metallic core can include a pair of hook elements 65, 65' positioned to receive roof clip member 60 to secure roof molding 38 within groove 36. Roof clip member 60 can include a lip portion 68 suitable for retaining hook elements 65 and 65'. Roof clip member 60 can further include a beveled leading edge 69 which facilitates the sliding and expansion of hook elements 65, 65' over clip member 60 and into a position retained by lip portion 68. The hook elements 65, 65' can be disposed periodically along the length of the roof molding 38 with a frequency selected to correspond to the location of the roof clip members 60 along the length of the groove 36.

Roof molding 38 can include a first exterior surface 70 and a second exterior surface 72 joined by an intermediate generally transverse wall 74. As described herein, surfaces 70 and 72 are described as being substantially horizontal. However, "substantially horizontal" as used herein is intended to recognize that an automotive vehicle roof may be contoured, but generally has a substantially horizontal orientation. In this regard, the present disclosure contemplates a roof molding 38 construction wherein the first exterior surface 70 is substantially coplanar with the exposed portion 58 of side panel 32 and the second exterior surface 72 is substantially coplanar with the exposed portion 40 of roof panel 30.

The roof molding 38 can include a plurality of elements to seal the elongated groove 36 from environmental elements such a rain and snow. Particularly, a side wall 80 depending from the first exterior surface 70 can be provided with a deformable extension 82 suitable for engaging notch 56 of side panel 32. Side wall 80 can include a further deformable extension 84 suitable for engaging the side wall 54 of side panel 32. Deformable extension 84 is disposed below the deformable extension 82 and substantially adjacent to hook element 65. The deformable extensions 82 and 84 can be formed of the polymeric coating or may be formed of an alternative resilient material such as styrene butadiene rubber.

Second exterior surface 72 may further include an elastically deformable extension 90 for engaging top edge 42 of roof panel 30. A second elastically deformable extension 92 can extend from surface 94 and resiliently engage side wall 44 of roof panel 30 to provide an additional sealing mechanism between the roof molding 38 and the groove 36. The deformable extensions 90 and 92 can be formed of the polymeric coating or may be formed of an alternative resilient material such as styrene butadiene rubber. Each of the deformable extensions 82, 84, 90, and 92 can run the length of the roof molding 38 to create a flange acting as a seal mechanism throughout its full extent.

Advantageously, the presently described roof molding 38 provides an aesthetically pleasing flush appearance between the first exterior surface 70 and the exposed surface 58 of side panel 32 and between second exterior surface 72 and exposed surface 40 of roof panel 30. More particularly, by providing first exterior surface 70 in a coplanar orientation with exposed surface 58 of side panel 32 and second exterior surface 72 in a coplanar orientation with exposed surface 30 of roof panel 32, there is no discontinuity apparent to an observer. Furthermore, a trough 100 is established by the relationship of first exterior surface 70 relative to the second exterior surface 72 via transverse wall 74. Trough 100 serves as a mechanism for channeling water away from side passenger windows.

Referring now to FIG. 4, an alternative embodiment is depicted wherein roof molding 138 again includes an elongated main body 162 having a core 164 embedded within a synthetic coating 163. Roof molding 138 again includes a first exterior surface 170 that is substantially coplanar with an exposed adjacent surface of the side panel. Similarly, second exterior surface 172 is substantially coplanar with the adjacent exposed surface 140 of the roof panel. Roof molding 138 differs from the prior embodiment in that deformable extensions 182 and 184 are positioned to engage the side wall 154 in moderately different locations. This demonstrates that the specific positioning of the seal mechanisms (e.g. 82, 84, 182, 184, 90, 190) is not necessarily critical to performance. Furthermore, base portion 148 of the roof panel is spaced from the base portion 150 of the side panel. This facilitates the inclusion of a deformable extension 196, depending from hook 165' and engaging the base portion 148. This embodiment demonstrates that there is no particular orientation of the deformable sealing extensions that is required, nor is there a particular shape of the channel forming the elongated groove that is required to achieve the advantages of the present roof molding design.

Figure 5:
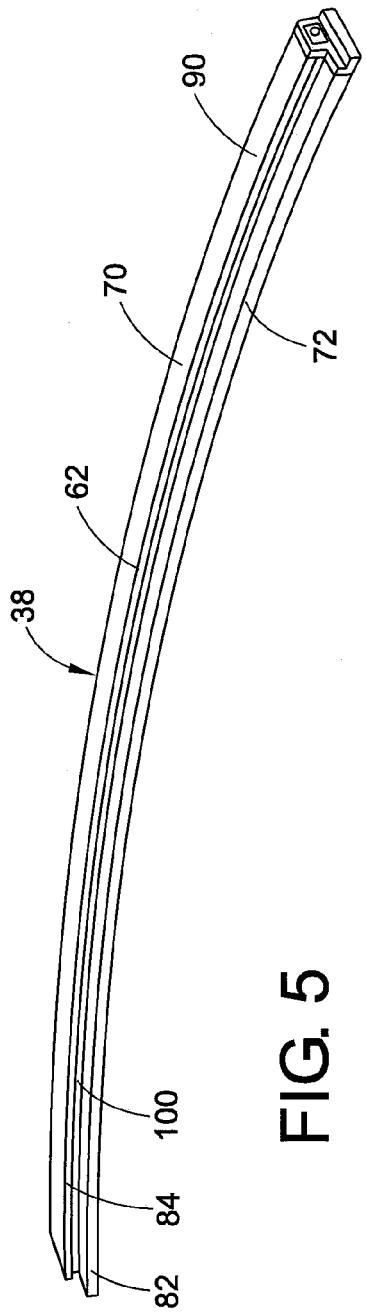
FIG. 5 is a perspective view of the elongated roof molding of FIG. 3.

As depicted in FIG. 5, the roof molding 38 of the present disclosure will typically be of an elongated nature. In this regard, the elastomeric projections 82, 84, 90 and 92 (not visible) are anticipated to run lengthwise of the elongated body and provide sealing along the length of the groove. The clip arrangements and the vehicle mounted clip projections will be interspersed along the length as required to provide sufficient mechanical attachment of the molding to the vehicle body.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A roof joint construction for an automobile having a roof panel with a side edge and a side outer panel with an upper edge, the roof joint construction comprising:
   an elongated channel extending substantially parallel to the side edge of the roof panel and having first and second substantially vertical side walls joined by a substantially horizontal base, said first side wall extending to engage the side edge of the roof panel, said second side wall extending to engage said upper edge of the side outer panel; and
   a molding filling said elongated channel, said molding comprising an elongated body having a first molding edge engaging the side edge of the roof panel and a second molding edge engaging the vertical side wall of the side outer panel, and a primary surface extending between the first molding edge and the second molding edge, the primary surface including a generally planar first substantially horizontal region, a generally planar second substantially horizontal region and a generally vertical step wall joining the first substantially horizontal region to the second substantially horizontal region.

2. The roof joint construction of claim 1, wherein:
   the upper edge of the side outer panel extends above the height of the side edge of the roof panel.

3. The roof joint construction of claim 1, wherein the vertical step wall and the second horizontal region form a trough for channeling water away from a side window.

4. The roof joint construction of claim 1, further comprising:
   a plurality of projections fixed to the base, the projections being disposed along the base and projecting upwardly from the base to engage the molding.

5. The roof joint construction of claim 4, wherein said molding includes a plurality of pairs of clips receiving said projections.

6. The roof joint construction of claim 5, wherein said pairs of clips include a first clip element adjacent the second molding edge and a second clip element adjacent from the generally vertical wall.

7. The roof joint construction recited in claim 1, wherein said molding comprises a metallic body defining at least the primary surface and wherein said first and second molding edge are each comprised of a polymeric material.

8. The roof joint construction of claim 5, wherein said molding includes a first flange engaging the first side wall and a second flange engaging the second side wall.

9. The roof joint construction of claim 8, wherein at least one of said flanges extends from at least one of said clip elements.

10. The roof joint construction of claim 8 wherein at least one of said flanges engages at least one of the side edge of the roof panel and the upper edge of the side outer panel.

11. The roof joint construction of claim 8, further comprising a third and a fourth flange disposed below each of the first and second flanges, respectively, said third flange engaging said first side wall.

12. The roof joint construction recited in claim 7, wherein at least said clips are comprised of metal.

13. The roof joint construction recited in claim 1, wherein the roof panel and the side outer panel overlap at the horizontal base and are welded.

14. The roof joint construction of claim 1, wherein said second molding edge engages said upper edge of the side panel.

15. A vehicle roof molding to be fitted into a roof groove of a roof panel of a vehicle, comprising: an elongated main body for filling at least a portion of the roof groove; a latching portion on a back side of the main body to secure the roof molding within the roof groove; said main body having a first segment and a second segment, said first and second segments residing in different planes and joined by a wall oriented generally transverse to each segment; a pair of protruding portions extending from opposed sides of the first and second segments, respectively, each protruding portion having an elastic deforming region engaging an opposed side wall of the roof groove when said latching portion is fitted in the roof groove.

16. The molding of claim 15, wherein said main body is comprised of a metal core including a polymeric coating.

17. The molding of claim 15, wherein said latching portion comprises a pair of hook elements.

18. The molding of claim 15, wherein each of said first and second segments comprise at least substantially planar exterior surfaces.

19. The molding of claim 15, wherein said different planes are at least generally parallel.

20. A vehicle roof molding to be fitted into a roof groove of a roof panel of a vehicle, said groove formed by an interface of a roof panel and a side panel, the molding comprising: a main body for filling at least a portion of the roof groove; a latching portion on a back side of the main body to secure the roof molding within the roof groove; said main body having an exterior surface of a first segment coplanar to an adjacent surface of the associated roof panel, said first segment engaging a side edge of the roof panel, and an exterior surface of a second segment coplanar to an adjacent surface of the associated side panel, said second segment engaging a vertical sidewall of the side panel, said first and second segments residing in different planes and joined by a wall oriented generally transverse to each segment to form a trough, said molding further comprising at least two flanges, one flange engaging a side wall of the groove adjacent the roof panel and one flange engaging a side wall of the groove adjacent the side panel.

* * * * *